(12) United States Patent
Hashizume et al.

(10) Patent No.: US 12,135,551 B2
(45) Date of Patent: Nov. 5, 2024

(54) AUTOMATIC BERTHING SYSTEM AND METHOD

(71) Applicant: Honda Motor Co., Ltd., Tokyo (JP)

(72) Inventors: Takashi Hashizume, Saitama (JP); Ryuichi Kimata, Tokyo (JP); Ryota Hisada, Tokyo (JP); Koichi Tsuno, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 207 days.

(21) Appl. No.: 17/956,850

(22) Filed: Sep. 30, 2022

(65) Prior Publication Data

US 2024/0111287 A1  Apr. 4, 2024

(51) Int. Cl.
| | |
|---|---|
| G05D 1/00 | (2024.01) |
| B63B 79/15 | (2020.01) |
| B63B 79/40 | (2020.01) |
| G05D 1/243 | (2024.01) |
| G05D 1/606 | (2024.01) |
| G05D 1/661 | (2024.01) |
| G05D 107/80 | (2024.01) |
| G05D 109/30 | (2024.01) |
| G05D 111/10 | (2024.01) |

(52) U.S. Cl.
CPC .......... *G05D 1/0206* (2013.01); *B63B 79/15* (2020.01); *B63B 79/40* (2020.01); *G05D 1/243* (2024.01); *G05D 1/606* (2024.01); *G05D 1/661* (2024.01); *G05D 2107/84* (2024.01); *G05D 2109/34* (2024.01); *G05D 2111/10* (2024.01)

(58) Field of Classification Search
None
See application file for complete search history.

(56) References Cited

U.S. PATENT DOCUMENTS

| | | | | |
|---|---|---|---|---|
| 10,429,845 | B2* | 10/2019 | Arbuckle | B63H 21/21 |
| 11,175,663 | B1* | 11/2021 | Johnson | B63B 79/40 |
| 11,702,178 | B2* | 7/2023 | Dannenberg | G05D 1/0206 |
| | | | | 701/21 |
| 2022/0291688 | A1* | 9/2022 | Afman | B63B 79/40 |
| 2023/0221724 | A1* | 7/2023 | Lewandowski | G05D 1/0206 |
| | | | | 701/21 |

* cited by examiner

*Primary Examiner* — Todd Melton
(74) *Attorney, Agent, or Firm* — JCIPRNET

(57) ABSTRACT

An automatic berthing system and method for a vessel are provided. The automatic berthing system comprises a controller, controlling the vessel; an input part, receiving an input to perform the automatic berthing mode; at least one peripheral sensor, detecting position information and speed information of another vessel other than the vessel to determine whether a wake caused by the another vessel has influence on the vessel. The controller performs an automatic berthing control when the input to perform the automatic berthing mode is received until the vessel reaches a berthing position, and the controller stops the automatic berthing control when the another vessel is located within a predetermined distance from the vessel based on the position information.

20 Claims, 3 Drawing Sheets

AUTOMATIC BERTHING SYSTEM AND METHOD

BACKGROUND

Technical Field

The invention relates to a control method for vessel, and particularly to an automatic berthing system and method.

Description of Related Art

In the automatic berthing system, disturbance due to wake of another vessel is an issue that makes the vessel maneuvering control difficult. In particular, receiving a large wake just before berthing is dangerous because it may collide with the pier.

Therefore, developing a solution to reduce the influence of the wake caused by the another vessel is required.

SUMMARY

In view of the above description, according to one embodiment of the disclosure, an automatic berthing system for a vessel is provided. The automatic berthing system comprises a controller, controlling the vessel; an input part, receiving an input to perform the automatic berthing mode; at least one peripheral sensor, detecting position information of an another vessel other than the vessel. The controller performs an automatic berthing control when the input to perform the automatic berthing mode is received until the vessel reaches a berthing position, and the controller stops the automatic berthing control when the another vessel is located within a predetermined distance from the vessel based on the position information.

According to one embodiment of the disclosure, in the automatic berthing system, the automatic berthing system further comprises a speed sensor that detects speed information of the another vessel. The controller stops the automatic berthing control when the another vessel is separated from the vessel within the predetermined distance and a speed from the speed information is equal to a predetermined speed or more.

According to one embodiment of the disclosure, in the automatic berthing system, the system further comprises a shaking sensor to detect shaking of the vessel due to the wake, and the automatic berthing control restarts when the shaking is smaller than a predetermined value.

According to one embodiment of the disclosure, in the automatic berthing system, the controller stops the automatic berthing control, and performs a stop control to stop the vessel at a fixed position.

According to one embodiment of the disclosure, in the automatic berthing system, when the another vessel is located within the predetermined distance from the vessel and the automatic berthing control is almost completed, the controller controls the vessel to separate from the berthing position by a distance, stops the automatic berthing control, and performs a stop control to stop the vessel at a fixed position.

According to one embodiment of the disclosure, in the automatic berthing system, the controller is further configured to calculate an arrival timing of the wake reaching the vessel according to a position and a speed of the another vessel, and the controller stops the automatic berthing control at the arrival timing.

According to one embodiment of the disclosure, in the automatic berthing system, the controller is further configured to calculate an arrival timing of the wake reaching the vessel by using a camera to capture an image of the wake, and the controller stops the automatic berthing control at the arrival timing.

According to one embodiment of the disclosure, in the automatic berthing system, the controller is further configured to calculate an arrival timing of the wake reaching the vessel according to shaking information acquired by a buoy on a sea level, and the controller stops the automatic berthing control at the arrival timing.

According to one embodiment of the disclosure, in the automatic berthing system, an existence of the another vessel is detected by the at least one peripheral sensor, or acquired by a communication method.

According to another embodiment of the disclosure, an automatic berthing method for a vessel is provided. The method comprises: detecting position information of an another vessel other than the vessel; performing an automatic berthing control until the vessel reaches a berthing position; and stopping the automatic berthing control when the another vessel is located within a predetermined distance from the vessel based on the position information.

According to the embodiment of the disclosure, the method further comprises: detecting speed information of the another vessel; and stopping the automatic berthing control when the another vessel is separated from the vessel within the predetermined distance and a speed from the speed information is equal to a predetermined speed or more.

According to the embodiment of the disclosure, the method further comprises detecting shaking of the vessel due to the wake; and restarting the automatic berthing control when the shaking is smaller than a predetermined value.

According to the embodiment of the disclosure, the method further comprises stopping the automatic berthing control, and performing a stop control to stop the vessel at a fixed position.

According to the embodiment of the disclosure, the method further comprises: when the another vessel is located within the predetermined distance from the vessel and the automatic berthing control is almost completed, controlling the vessel to separate from the berthing position by a distance; stopping the automatic berthing control; and performing a stop control to stop the vessel at a fixed position.

According to the embodiment of the disclosure, the method further comprises: calculating an arrival timing of the wake reaching the vessel according to the position information and the speed information of the another vessel; and stopping the automatic berthing control at the arrival timing.

According to the embodiment of the disclosure, the method further comprises: calculating an arrival timing of the wake reaching the vessel by using a camera to capture an image of the wake; and stopping the automatic berthing control at the arrival timing.

According to the embodiment of the disclosure, the method further comprises: calculating an arrival timing of the wake reaching the vessel according to shaking information acquired by a buoy on a sea level; and stopping the automatic berthing control at the arrival timing.

According to another embodiment of the disclosure, an automatic berthing system for a vessel is provided. The automatic berthing system comprises a controller, controlling the vessel; an input part, receiving an input to perform the automatic berthing mode. The controller is configured to perform prediction of an occurrence of a predetermined shaking of the vessel based on at least one of position and speed information of an another vessel, wind speed information, shaking information acquired by a buoy on a sea level and sensing information of the sea level. When the automatic berthing mode is input, the controller is configured to perform an automatic berthing control until the vessel reaches a berthing position. When the prediction of the occurrence of the predetermined shaking is made, the controller is configured to stops the automatic berthing control.

According to the embodiment of the disclosure, in the automatic berthing system, the controller stops the automatic berthing control when the another vessel is separated from the vessel within a predetermined distance and moves at speed equal to or larger than a predetermined speed or more.

According to the embodiment of the disclosure, in the automatic berthing system, after the automatic berthing control is stopped, and the controller is configured to perform a stop control to stop the vessel at a fixed position.

According to the embodiment of the disclosure, the movement of the other vessel sailing nearby (crossing) may be detected in advance by the peripheral sensors and the AIS system, and when it is determined that a large wake is coming according to the distance and speed of the other vessel, the automatic berthing control is temporarily stopped. In addition, when the automatic berthing control is about to be completed, the vessel is controlled to move away from the pier in order to avoid the vessel from colliding with the pier. In addition, when the wake is stopped, the shaking condition of the vessel is determined by the IMU, etc., and the automatic berthing control may be reliably stopped while the wake is occurring.

DESCRIPTION OF THE EMBODIMENTS

Figure 1:
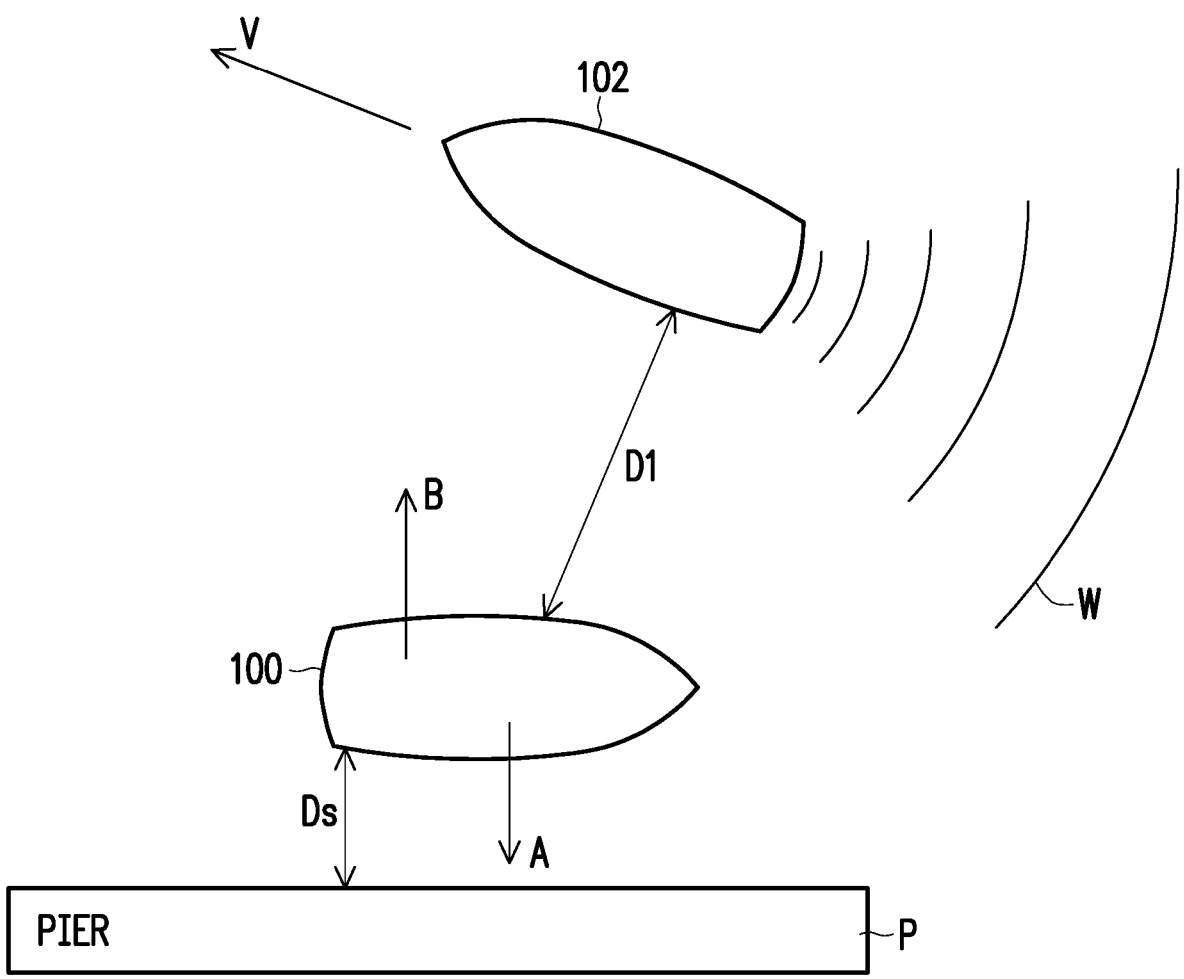
FIG. 1 illustrates a concept diagram according to one embodiment of the disclosure.

FIG. 1 illustrates a concept diagram according to one embodiment of the disclosure. In FIG. 1, the vessel (i.e., own vessel) 100 starts the automatic berthing control to stop the vessel 100 at the pier P (substantially in the direction A). During the automatic berthing control of the vessel 100, if another vessel 102 moves with a speed V1 and separates the vessel 100 with a distance D1, the wake W caused by the another vessel 102 may affect to the automatic berthing control of the vessel 100.

When the speed V1 of the another vessel 102 is fast enough and/or the distance D1 between the vessel 100 and the another vessel 102 is short enough, the wake W caused by the another vessel 102 may be large enough to make the vessel 100 shaking. This may make the vessel 100 dangerous during the automatic berthing control, and the vessel 100 may collide with the pier P or shore.

Therefore, when the sensors or the like detect there is the another vessel 102 within a predetermined distance and/or the another vessel 102 moves at a speed V equal to or larger than a predetermined speed, the automatic berthing control of the vessel 100 is stopped and the vessel 100 is also stops at a fixed position. Here, the automatic berthing control of the vessel 100 is stopped means that the automatic berthing control may be completely or temporally stopped. In this manner, by stopping the automatic berthing control, damage to the vessel may be avoided.

In addition, when the automatic berthing is almost completed, in addition to stopping the automatic berthing control, the vessel 100 is also driven to separate from the pier P (substantially in the direction B) by a safety distance Ds and is stopped at the fixed position to avoid the vessel 100 from colliding with the pier P. The detail will be further described below.

Figure 2:
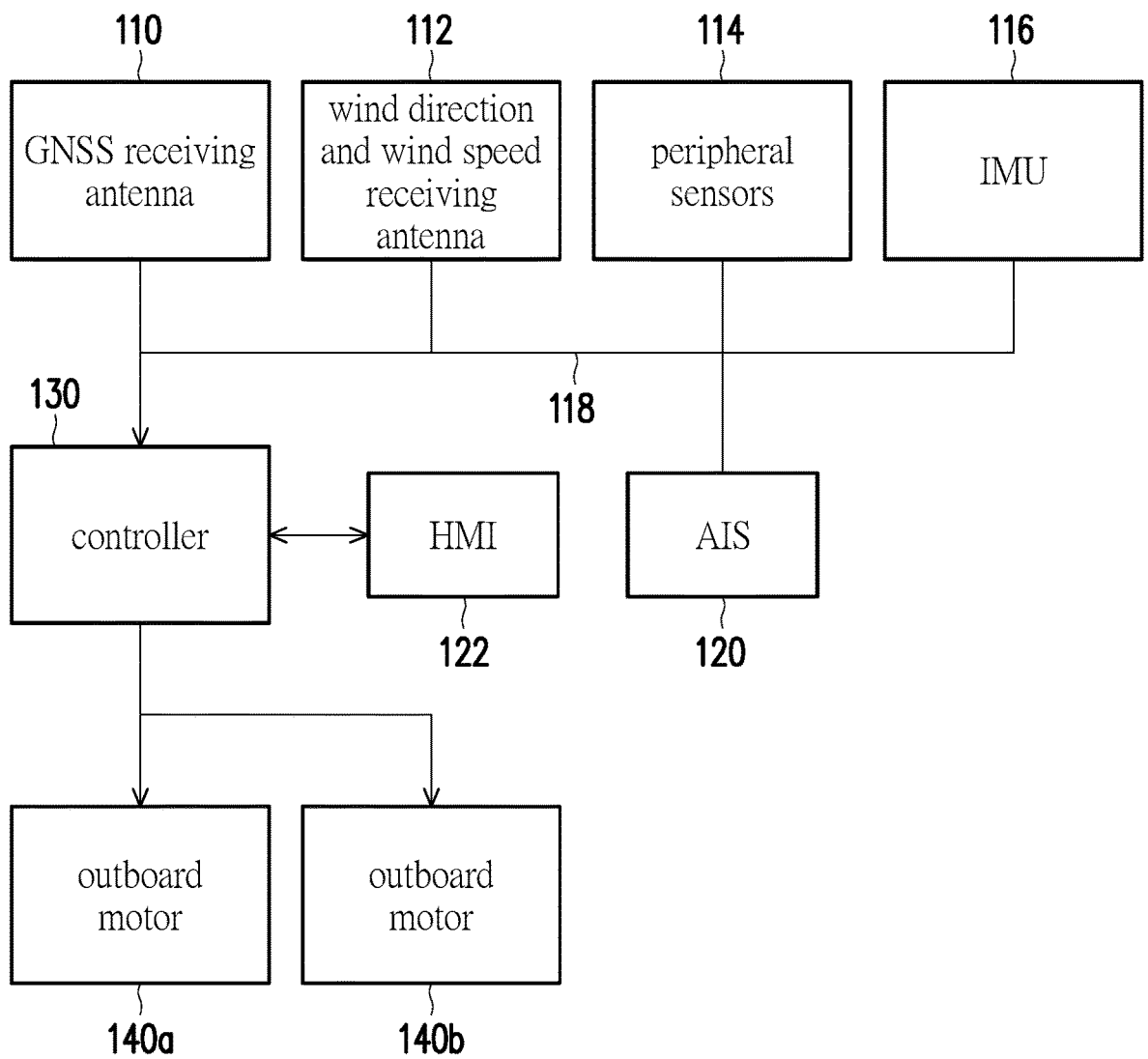
FIG. 2 illustrates a block diagram of a vessel according to one embodiment of the disclosure.

FIG. 2 illustrates a block diagram of a vessel according to one embodiment of the disclosure. In the following description, a boat with outboard motors as power driving the boat is used as an example of the vessel 100.

Referring to FIGS. 1 and 2, in this example, the vessel (for example, boat) 100 is powered by two outboard motors 140a and 140b. In other embodiment, one or more than two outboard motors may be equipped and the number of the equipped outboard motors is not particularly limited.

The vessel 100 may be equipped with plural sensor devices such as a GNSS receiving antenna 110, a wind direction and speed receiving antenna 112, and peripheral sensors 114.

The GNSS receiving antenna 110 is used to receive the GNSS signals. The GNSS (global navigation satellite system) is a system that uses satellites to provide autonomous geo-spatial positioning. The GNSS allows satellite navigation devices (the may be provided in the vessel 100) to determine the position (longitude, latitude, and altitude/elevation) with high precision using time signals transmitted along a line of sight by radio from satellites. The system can be used for providing position, navigation or for tracking the position of something fitted with a receiver (satellite tracking). With the GNSS receiving antenna 110, signals from the satellite may be received and the position of the vessel 100 may be determined.

The wind direction and speed receiving antenna 112 is used to receive data of the wind direction and the wind speed from the anemometer installed on the vessel 100. The vessel 100 may constantly receive the wind direction and wind speed by the wind direction and wind speed receiving antenna 112.

The peripheral sensors 114 may refer as external recognition sensors for recognizing the external environment and may comprise but not limit thereto camera, lidar, radar, sonar, ultrasonic sensor, etc. The peripheral sensors 114 may be used to detect the existence of another vessel. Alternatively, the peripheral sensors 114 may be used to detect a distance between the vessel 100 and the another vessel 102.

In addition, a human machine interface (HMI) 122 is also included in the vessel 100. The HMI 122 may refer as an input interface and be connected to the controller 130. The user, such as the driver of the vessel 100, can input parameters, select control modes, etc., through the HMI 122. For example, the user can select an automatic berthing mode through the HMI 122. Once the controller 130 receives the automatic berthing mode input by the user, the controller 130 starts to perform an automatic berthing control for the vessel 100. In one embodiment, the HMI 122 may be implemented by keyboard, mouse, touch panel or the like.

The controller 130 may be implemented by a processor, such as a central processing unit of a computer or the like. The controller 130 can control all components of the vessel 100. In this embodiment, it focuses on an automatic berthing control. When the controller 130 performs the automatic berthing control, the vessel 100 will be automatically guided to a pier, quay or similar fixture, or be automatically guided to an allotted space at the pier, quay or similar fixture. The automatic berthing control can be made through the controller 130 performing controls of the outboard motors 140a, 140b.

According to the embodiment, the automatic berthing system may comprise a speed sensor that detects speed information of the another vessel 102. When the controller 130 performs the automatic berthing control, and the another vessel is separated from the vessel within the predetermined distance and a speed from the speed information is equal to or larger than a predetermined speed or more, the controller 130 may stop the automatic berthing control. In this manner, the influence on the vessel 100 due to the wake caused by the another vessel 102 may be reduced.

In addition, an inertial measurement unit (IMU) 116 may be further included and used as a shaking sensor. The IMU 116 is an electronic unit which records angular velocity and linear acceleration data which is fed into a central processing unit for data interpreting and logging. The unit constitutes of two independent sensors. The first sensor is the 3-axis gyroscope and second sensor is the 3-axis accelerometer. The IMU should also have a data interpreter that can draw the track it went through. Therefore, the IMU 116 may be used to detect whether the shaking of the vessel 100 due to the wake of the another vessel 102 stops or is smaller than a predetermined value.

When the automatic berthing control is stopped and the IMU (used as the shaking sensor) 116 detects the shaking of the vessel 100 due to the wake of the another vessel 102 stops or is smaller than a predetermined value, the automatic berthing control restarts. Therefore, the automatic berthing control may be performed safely and may not be significantly affected by the wake of the another vessel 102.

An automatic identification system (AIS) 120 is also included. The AIS is an automatic tracking system that uses transceivers on vessels and is used by vessel traffic services (VTS). Information provided by AIS 120, such as unique identification, position, course, and speed, can be displayed on a screen or an electronic chart display and information system (ECDIS). AIS 120 is intended to assist a vessel's watchstanding officers and allow maritime authorities to track and monitor movements of other vessels.

The GNSS receiving antenna 110, the wind direction and speed receiving antenna 112, and peripheral sensors 114, the AIS 120 and the controller 130 are all connected to a bus 118, information or data received by GNSS receiving antenna 110 and the wind direction and speed receiving antenna 112, or sensed by the peripheral sensors 114 may be transmitted to the controller 130 through the bus 118.

Figure 3:
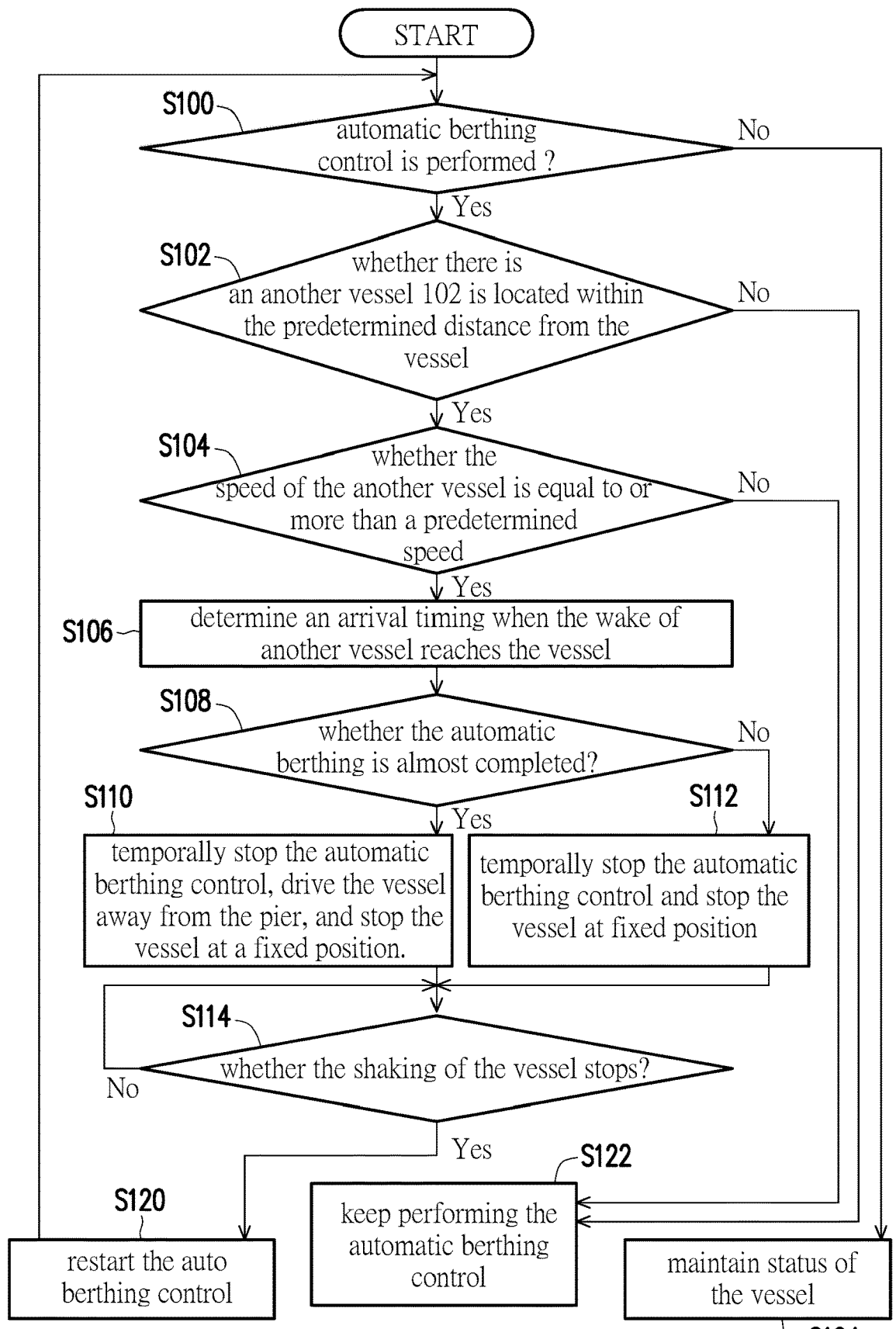
FIG. 3 illustrates a flow chart of an automatic berthing method according to one embodiment of the disclosure.

FIG. 3 illustrates a flow chart of an automatic berthing method according to one embodiment of the disclosure.

In FIG. 3, at step S100, whether the automatic berthing control is performed is determined. For example, as described above, if the user selects the automatic berthing mode through the HMI 122, then the controller 130 can determine the automatic berthing control is performed. In addition, if the automatic berthing control is in progress, the controller 130 can determine the automatic berthing control is performed. Furthermore, when the automatic berthing control is not performed, the procedure processes to step S124 to maintain the status of the vessel 100 or restart the automatic berthing control. In the situation, the automatic berthing control may be completed or temporally stopped.

When the automatic berthing control is completed, the vessel 100 is docked or berthed at the pier or quay. When the automatic berthing control is stopped, the controller 130 restarts the automatic berthing control.

In addition, when the controller 130 determines that the automatic berthing control is performed, the procedure processes to step S102. At step S102, it determines whether there is an another vessel 102 is located within the predetermined distance from the vessel 100 (refer to FIG. 1). When the another vessel 102 is beyond the predetermined distance from the vessel 100, it means the wake caused by the another vessel does not affect the vessel 100. Then, the automatic berthing control processes to step S122, the automatic berthing control keeps performing.

The peripheral sensors 114 in FIG. 2, such as camera, lidar, radar, sonar, ultrasonic sensor, etc., may be used to detect the existence of the another 102. Namely, the peripheral sensors 114 together with the controller may be used to determine whether the another vessel 102 is located within the predetermined distance from the vessel 100. In addition, the existence of the another 102 may be detected by communication. For example, when the another vessel 102 detects that a distance between the vessel 100 and the another vessel 102 is equal to or smaller than the predetermined distance, the another vessel may notify the vessel 100 by any communication device, such as phone, radio or light, etc.

In addition, when the controller 130 determines the another vessel 102 is located within the predetermined distance from the vessel 100, it means the another vessel 102 is close the vessel 100 and the wake caused by the another vessel may affect the automatic berthing control of the vessel 100. Then, the automatic berthing control processes to step S104 to determine whether the speed of the another vessel 102 is equal to or more than a predetermined speed.

When the speed of the another vessel 102 exceeds the predetermined speed, the wake caused by the another vessel 102 may become larger and the automatic berthing control may be severely affected. Namely, when the speed of the another vessel 102 is equal to or more than the predetermined speed, the automatic berthing control processes to step S106 to determine or calculate an arrival timing when the wake caused by the another vessel 102 reaches the vessel 100.

In one embodiment, the arrival timing of the wake reaching the vessel 100 may be calculated or predicted according to the speed and the position of the another vessel 102, and the automatic berthing control will be stopped at the predicted or calculated timing. The preferable timing is slightly before the arrival time. In addition, the arrival timing of the wake reaching the vessel 100 may be calculated or predicted by capturing an image of the wake to analyze the motion of the wake, and the automatic berthing control will be stopped at the predicted or calculated timing. Also, the preferable timing is slightly before the arrival time. In addition, the arrival timing of the wake reaching the vessel 100 may be calculated or predicted based on shaking information acquired by a buoy on the sea level, and the automatic berthing control will be stopped at the predicted or calculated timing.

When the speed of the another vessel 102 doe not exceed the predetermined speed, the speed of the another vessel 102 is slow and the wake does not occur. Therefore, the vessel 100 is not affected by the another vessel 102. The automatic berthing control also processes to step S122.

At step S108, the automatic berthing control determines whether the berthing is almost completed. When the vessel 100 is close to the pier or quay, the automatic berthing control may be determined to be almost completed. In one embodiment, a distance between the vessel and the pier or quay may be used as a reference for determining whether the berthing is almost completed.

In the embodiment, in order to reduce the influence of the wake caused by the another vessel 102, two situations are considered. At step S108, when the automatic berthing is almost completed, the automatic berthing control processes to step S110. At step S110, the controller 130 stops the automatic berthing control at the arrival timing predicted or calculated at step S106 or slightly before the arrival timing. Furthermore, in order to avoid the vessel from colliding with the pier or quay, the controller 130 further controls the outboard motors 140a, 140b to drive the vessel 100 to be away from the pier or quay by a distance (or a safety distance) and stops the vessel 100 at a fixed position.

At step S108, when the automatic berthing is still in operation and not almost completed, the automatic berthing control processes to step S112. At this time, since the automatic berthing is still in operation, the vessel 100 is still away from the pier or quay, the vessel 100 has no immediate situation that the vessel 100 will collide with the pier or quay due to the wake caused by the another vessel 102. Therefore, in this situation, at step S112, the controller 130 stops the automatic berthing control at the arrival timing calculated or predicted at step S106, or slightly before the arrival timing, and then stops the vessel 100 at a fixed position.

At step S114, whether the shaking of the vessel 100 due to the wake caused by the another vessel 102 is stopped is determined. If the shaking of the vessel 100 is stopped, it is safe for the vessel 100 to perform the automatic berthing control and thus the procedure processes to step S120 and the automatic berthing control is restarted. If the shaking of the vessel 100 is not stopped, then the procedure processes to step S114 again to keep determining whether the shaking of the vessel 100 due to the wake caused by the another vessel 102 is stopped.

At step S114, the IMU 116 illustrated in FIG. 2 can be used to detect the shaking of the vessel 100, and the controller 130 may receive the detected data to determine whether the shaking of the vessel 100 due to the wake caused by the another vessel 102 is stopped. Once the shaking of the vessel 100 is stopped, the controller 130 may restart the automatic berthing control.

According to the embodiment of the disclosure, the movement of the other vessel sailing nearby (crossing) may be detected in advance by the peripheral sensors (such as LiDAR, radar, etc.) and the AIS, and when it is determined that a large wake is coming according to the distance and speed of the other vessel, the automatic berthing control is temporarily stopped. In addition, when the automatic berthing control is about to be completed, the vessel is controlled to move away from the pier in order to avoid the vessel from colliding with the pier. In addition, when the wake is stopped, the shaking condition of the vessel is determined by the IMU, etc., and the automatic berthing control may be reliably stopped while the wake is occurring.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An automatic berthing system for a vessel, comprising
   a controller, controlling the vessel;
   a human machine interface, receiving an input to perform the automatic berthing mode;
   at least one peripheral sensor, detecting position information of an another vessel other than the vessel;
   wherein the controller performs an automatic berthing control when the input to perform the automatic berthing mode is received until the vessel reaches a berthing position, and
   the controller stops the automatic berthing control when the another vessel is located within a predetermined distance from the vessel based on the position information.

2. The automatic berthing system according to claim 1, further comprising a speed sensor that detects speed information of the another vessel,
   the controller stops the automatic berthing control when the another vessel is separated from the vessel within the predetermined distance and a speed from the speed information is equal to a predetermined speed or more.

3. The automatic berthing system according to claim 1, further comprising a shaking sensor to detect shaking of the vessel due to the wake, and
   wherein the automatic berthing control restarts when the shaking is smaller than a predetermined value.

4. The automatic berthing system according to claim 1, wherein the controller stops the automatic berthing control, and performs a stop control to stop the vessel at a fixed position.

5. The automatic berthing system according to claim 1, wherein when the another vessel is located within the predetermined distance from the vessel and the automatic berthing control is almost completed, the controller controls the vessel to separate from the berthing position by a distance, stops the automatic berthing control, and performs a stop control to stop the vessel at a fixed position.

6. The automatic berthing system according to claim 1, wherein the controller is further configured to calculate an arrival timing of the wake reaching the vessel according to a position and a speed of the another vessel, and the controller stops the automatic berthing control at the arrival timing.

7. The automatic berthing system according to claim 1, wherein the controller is further configured to calculate an arrival timing of the wake reaching the vessel by using a camera to capture an image of the wake, and the controller stops the automatic berthing control at the arrival timing.

8. The automatic berthing system according to claim 1, wherein the controller is further configured to calculate an arrival timing of the wake reaching the vessel according to shaking information acquired by a buoy on a sea level, and the controller stops the automatic berthing control at the arrival timing.

9. The automatic berthing system according to claim 1, wherein an existence of the another vessel is detected by the at least one peripheral sensor, or acquired by a communication method.

10. An automatic berthing method for a vessel, comprising
    detecting position information of an another vessel other than the vessel;

performing an automatic berthing control until the vessel reaches a berthing position; and stopping the automatic berthing control when the another vessel is located within a predetermined distance from the vessel based on the position information.

11. The automatic berthing method according to claim 10, further comprising:

detecting speed information of the another vessel; and stopping the automatic berthing control when the another vessel is separated from the vessel within the predetermined distance and a speed from the speed information is equal to a predetermined speed or more.

12. The automatic berthing method according to claim 10, further comprising detecting shaking of the vessel due to the wake; and restarting the automatic berthing control when the shaking is smaller than a predetermined value.

13. The automatic berthing method according to claim 10, further comprising:

stopping the automatic berthing control, and performing a stop control to stop the vessel at a fixed position.

14. The automatic berthing method according to claim 10, further comprising:

when the another vessel is located within the predetermined distance from the vessel and the automatic berthing control is almost completed, controlling the vessel to separate from the berthing position by a distance;

stopping the automatic berthing control; and performing a stop control to stop the vessel at a fixed position.

15. The automatic berthing method according to claim 10, further comprising:

calculating an arrival timing of the wake reaching the vessel according to the position information and the speed information of the another vessel; and stopping the automatic berthing control at the arrival timing.

16. The automatic berthing method according to claim 10, further comprising:

calculating an arrival timing of the wake reaching the vessel by using a camera to capture an image of the wake; and stopping the automatic berthing control at the arrival timing.

17. The automatic berthing method according to claim 10, further comprising calculating an arrival timing of the wake reaching the vessel according to shaking information acquired by a buoy on a sea level; and stopping the automatic berthing control at the arrival timing.

18. An automatic berthing system for a vessel, comprising a controller, controlling the vessel;

a human machine interface, receiving an input to perform the automatic berthing mode;

wherein the controller is configured to perform prediction of an occurrence of a predetermined shaking of the vessel based on at least one of position and speed information of an another vessel, wind speed information, shaking information acquired by a buoy on a sea level and sensing information of the sea level, when the automatic berthing mode is input, the controller is configured to perform an automatic berthing control until the vessel reaches a berthing position, and when the prediction of the occurrence of the predetermined shaking is made, the controller is configured to stops the automatic berthing control.

19. The automatic berthing system according to claim 18, wherein controller stops the automatic berthing control when the another vessel is separated from the vessel within a predetermined distance and moves at speed equal to or larger than a predetermined speed or more.

20. The automatic berthing system according to claim 18, wherein after the automatic berthing control is stopped, and the controller is configured to perform a stop control to stop the vessel at a fixed position.

* * * * *